Sept. 20, 1949.     J. F. HYDE ET AL     2,482,276
PREPARATION OF THERMOPLASTIC POLYSILOXANES
Filed Oct. 27, 1948
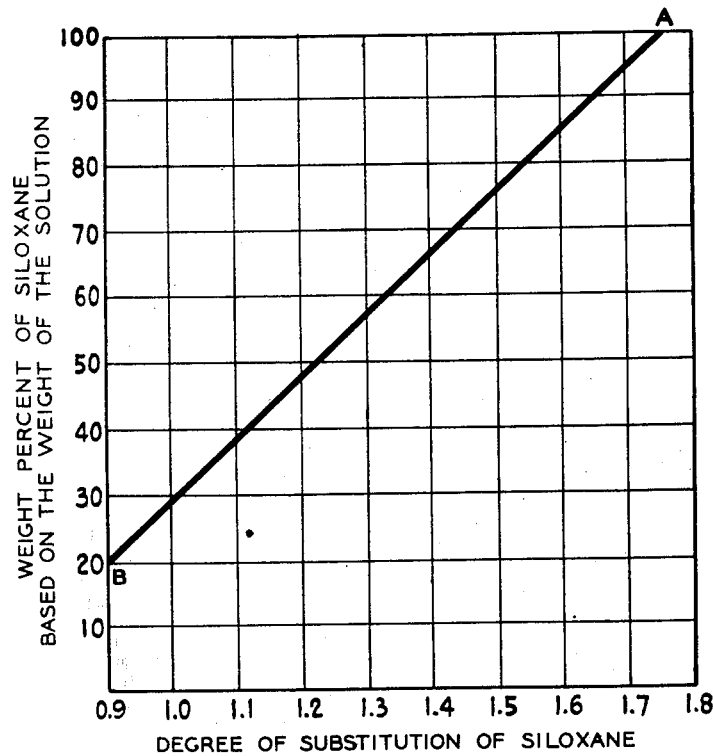
INVENTORS
JAMES FRANKLIN HYDE
BY WILLIAM HERBERT DAUDT
*ATTORNEY*

Patented Sept. 20, 1949

2,482,276

UNITED STATES PATENT OFFICE 2,482,276

PREPARATION OF THERMOPLASTIC POLYSILOXANES

James Franklin Hyde and William Herbert Daudt, Corning, N. Y., assignors to Dow Corning Corporation, Midland, Mich., a corporation of Michigan Application October 27, 1948, Serial No. 56,900

8 Claims. (Cl. 260—46.5)

This invention relates to the preparation of hydroxyl-free, heat-stable, thermoplastic siloxanes.

The thermosetting organo siloxane resins of commerce are those which contain high proportions of unsubstituted and/or monoorgano substituted siloxane units. One of the chief difficulties in the commercial application of such resins is that they tend to gel upon standing. The insoluble, infusible gels so formed cannot be satisfactorily applied to surfaces. Thus, in order to utilize these materials it is necessary either to employ them immediately after manufacture or to dilute the resins with solvent. Only solutions of these resins can be safely stored and shipped. This involves the handling of large volumes of material, thus increasing the cost and hazard of shipping such siloxanes. It is highly desirable, therefore, to provide a method by which stable, solvent-free siloxane resins may be prepared.

It is an object of this invention to prepare non-gelling, thermoplastic siloxane resins which can be stored in a solvent-free condition and which can thereafter be catalytically thermoset at will. Another object is to prevent the formation of voids during the setting of siloxane resins. Other objects will appear from the following description.

In accordance with this invention an organo polysiloxane having a degree of substitution of between 0.9 and 1.77 organic radicals per silicon atom, which radicals are methyl or aryl and in which siloxane there is at least one aryl radical per 20 silicon atoms, is treated with an alkali metal hydroxide in amount of from one alkali metal atom per 10,000 silicon atoms to one alkali metal atom per 50 silicon atoms. The treatment is carried out in a solution wherein the siloxane and the alkali are dispersed in an inert solvent. The solution has a concentration expressed as percent by weight siloxane based on the weight of the solution of less than 2(45 D—30) where D is equal to the degree of substitution of the siloxane. The solution is maintained at a temperature between 30° and 250° C. until a hydroxyl-free material is obtained. If desired, the treatment may be continued until the siloxane solution has reached a constant viscosity.

The organo polysiloxanes which are employed as the starting materials in the process of this invention are composed of alternate silicon and oxygen atoms, the silicon atoms having substituted thereon various numbers of organic radicals. The polysiloxanes contain at least 0.1 per cent by weight hydroxyl radicals, which radicals are linked to the silicon atoms. The proportions of the variously substituted silicon atoms are such that the degree of substitution is between 0.9 and 1.77 organic radicals per silicon atom. These radicals are selected from the group consisting of methyl and aryl radicals. There is present at least one aryl radical per 20 silicon atoms. Preferably, the siloxane contains both methyl and monocyclic aryl radicals.

These siloxanes may be prepared by any appropriate method. Such methods include a cohydrolysis and co-condensation of the corresponding hydrolyzable silanes, catalytic co-condensation of partially polymerized polysiloxanes, and the reaction of silicon halides with alkali metal salts of organo silanols.

The siloxane and an alkali metal hydroxide are dispersed in an inert solvent. An inert solvent is one which does not react with the siloxane or the alkali metal hydroxide. Such solvents include aromatic hydrocarbons such as benzene, toluene, and xylene; aliphatic hydrocarbons such as petroleum ether, and cyclohexane; aliphatic and aromatic ethers; and alcohols.

The minimum concentration at which insoluble, infusible material forms in the solution of the siloxane and does not dissolve upon further treating at the same concentration is termed the gel point. In some instances gel may form below the gel point but in such cases the insoluble material will re-dissolve upon further treating at the same concentration.

The gel point varies with the degree of substitution of the siloxane. For a better understanding of the effect of the degree of substitution of the siloxane upon the concentration at the gel point, recourse should be had to the accompanying drawing. The drawing is a graph in which the degree of substitution expressed as the number of organic radicals per silicon atom is plotted on the horizontal grid scale and the concentration expressed as weight percent of the siloxane based upon the weight of the solution is plotted on the vertical grid scale. In the drawing, the line AB shows the gel point for siloxanes having varying degrees of substitution. It is to be noted that the gel point increases with increasing degree of substitution until at degrees of substitution of above 1.77 the gel point is at 100 percent concentration.

Thermoplastic, heat-stable materials are obtained by treating the siloxanes at any concentration below the line AB. If the resins are treated at concentrations at or above AB, gelation occurs.

In such cases the siloxane may be re-dissolved by adjusting the concentration to any point below the line AB and continuing the treatment.

The slope of the line AB in terms of concentration and degree of substitution is given by the equation: concentration=2(45 $D$—30) where $D$ is the degree of substitution.

It is preferred that the amount of alkali metal hydroxide employed be from one alkali metal atom per 10,000 silicon atoms to one alkali metal atom per 50 silicon atoms. If the ratio of alkali metal to silicon is less than 1 to 10,000 the rate of rearrangement of the siloxane is too slow to be practicable. At ratios above 1 to 50 there is a tendency for the alkali to precipitate in the form of siloxane salts and to act as end-blockers for the siloxane molecules. The latter phenomenon hinders the formation of high polymers.

The present process may be carried out at temperatures ranging from 30° C. up to 250° C. The desired products are obtained at any temperature within this range, however, at the higher temperatures the rate of reaction is faster. Ordinarily, the treatment is carried out at the reflux temperature of the solvent. This will vary with the type and concentration of the solvent employed. In some cases it may be desirable to use pressure in order to raise the temperature obtainable with a given system. In general, the preferred temperature range is from 80° to 200° C.

The solution treatment of the siloxanes is continued at least until the material is free of hydroxyl groups. The condensation of the latter takes place rapidly under the conditions of this invention, and the resulting resins exhibit markedly improved heat stability over the untreated resins and are capable of being kept in a neutral solvent-free state without gelling.

It has been found that maximum heat stability and improved resins are obtained if the treatment is continued until the solution reaches a constant viscosity. The changes which take place after removal of hydroxyl groups are due mainly to siloxane bond rearrangement. By this rearrangement, siloxanes may either polymerize or depolymerize depending upon the concentration of the solution and the degree of polymerization of the siloxane. In effect therefore, when the solution has reached a constant viscosity the rates of polymerization and depolymerization are equal and the system is in equilibrium. Thus, the siloxane is equilibrated.

For a siloxane of a given degree of substitution, the degree of polymerization obtainable at equilibrium depends upon the concentration of the solution during alkali treatment. The higher the concentration of the solution the higher is the degree of polymerization of the equilibrated siloxane. Thus, by varying the concentrations at which the alkali treatment is carried out a wide variety of products may be obtained. These include oils of various viscosities, soft, thermoplastic resins and hard, high-melting solids. The highest molecular weight thermoplastic materials are obtained by employing concentrations which fall just below the line AB in the accompanying drawing.

The applicants have discovered that by treating hydroxyl containing siloxanes with an alkali metal hydroxide in the manner of this invention it is possible to obtain stable, thermoplastic resins which may be kept in storage for indefinite periods at room temperature without becoming infusible or insoluble in toluene. These materials will remain thermoplastic for long periods at 250° C.

The siloxanes of this invention which conform to the above description are non-gelling and heat-stable.

Compositions of this invention may be maintained in solution in contact with the alkali metal indefinitely without gelling provided the concentration is below the gel point. To obtain a stable, solvent-free product the alkali is removed before evaporating the solvent. This may be accomplished either by washing the solution until neutral or by neutralizing the alkali with chlorosilanes such as trimethylchlorosilane. When the last method is used it is not necessary to wash out the resulting alkali metal salts.

The neutral, heat-stable, thermoplastic materials described herein may be employed as such in a wide variety of applications. For example, the high melting materials are eminently adaptable for use as an insulating material in which electrical equipment is embedded. Furthermore, due to their long shelf life the materials may be stored or shipped great distances without becoming unusable due to gelation. When it is desired to obtain infusible solvent-resistant resins the materials may be mixed with siloxane bond rearrangement catalysts and heated to polymerize them further. Thus, the materials are useful as stable intermediates in the production of cured films and impregnants.

Catalysts which may be employed to further polymerize the solvent-free resins include alkali metal hydroxides, alkali metal salts of organo silanols, alkali metal salts of carboxylic acid and lead salts of carboxylic acids.

By employing the completely condensed solvent-free resins of this invention the formation of voids which is a common occurrence in the setting of conventional siloxane resins is obviated. Such voids are due to escape of water vapor, caused by the condensation of hydroxyl groups, and to the escape of solvent vapor. When these vapors are entrapped in a resin of high viscosity a bubble results. After the resin has been cured the void so formed remains. Since the resins of this invention are hydroxyl and solvent free no vapor bubbles are formed when they are polymerized by means of heat and a siloxane bond rearrangement catalyst. Thus, a major difficulty in the application of siloxane resins to electrical equipment has been removed.

In order that those skilled in the art may better understand the invention, recourse should be had to the following examples which should be considered as illustrative only.

EXAMPLES

*Example 1*

A copolymeric siloxane having a degree of substitution of one organic radical per silicon atom and a composition of 35 prime mol per cent $C_6H_5SiO_{1.5}$ and 65 prime mol per cent $CH_3SiO_{1.5}$ and containing about 0.7 per cent OH based on the weight of the siloxane was treated as follows: A 60 per cent by weight solution containing 170.9 g. of the siloxane in 114 g. of toluene was diluted by the addition of 1198 g. of toluene to give a solution containing 11.5 per cent by weight of the copolymer. A solution of 2.064 g. of 50 per cent aqueous KOH in 5 cc. of methanol was added. This gives a potassium to silicon atomic ratio of 1 to 100. The alkaline siloxane solution was heated to reflux. Water began to collect immediately in the condenser trap and was removed along with alcohol in the first 25 cc. of distillate. Some gel formed but this re-dissolved upon refluxing for one hour. Toluene was removed by distillation until the solution reached a concentration of 18.1 per cent by weight of siloxane. Refluxing was continued at this concentration until the viscosity of the solution became constant. The solution was cooled, diluted with ether and washed with dilute acid and water until neutral. The solvent was removed leaving as a residue a hard, brittle solid which melted to a viscous liquid at 250° C. This material remained thermoplastic and toluene-soluble after 24 hours at 250° C. By contrast the original untreated copolymer became infusible and insoluble in toluene after 15 minutes at 250° C. The thermoplastic residue had a nil hydroxyl content as determined by the Zerewitinoff method.

*Example 2*

The initial siloxane of Example 1 was refluxed in 28.9 per cent toluene solution with KOH in amount of one potassium atom to 100 silicon atoms. Refluxing was continued until the viscosity of the solution became constant. The solution was cooled, diluted with ether and washed with dilute acid and with water until neutral. The solvent was evaporated leaving a residue which was a hard, brittle material which melts above 250° C. A 50 per cent by weight toluene solution of this material has a viscosity of 19.7 cs. at 25° C. as compared with a viscosity of 11.5 cs. at 25° C. for a 50 per cent toluene solution of the treated resin of Example 1.

*Example 3*

The siloxane employed in this run had a composition of 33 prime mol per cent $(CH_3)_2SiO$, 36 prime mol per cent $C_6H_5SiO_{1.5}$ and 31 prime mol per cent $CH_3SiO_{1.5}$. The copolymer had a degree of substitution of 1.3 organic radicals per silicon atom and a hydroxyl content of about one per cent by weight.

A solution of 107.7 g. of the siloxane in 71.8 g. of toluene was diluted to a concentration of 30 per cent by weight siloxane by the addition of 207 cc. of toluene. The solution was refluxed in the presence of 0.686 g. of powdered 86 per cent KOH. The atomic ratio of K to Si was 1 to 89. During the first half hour water split out and was removed through the take-off condenser. Some gel formed but this was completely re-dissolved in two hours. The concentration of the solution was gradually raised to 50 per cent by the slow distillation of 165 cc. of toluene. The removal of the toluene was carried out over a period of four hours. At this point the viscosity of the solution was 19.1 cs. at 25° C. This increased to only 20.8 cs. at 25° C. after 24 hours additional refluxing.

A sample of the alkaline solution was withdrawn and allowed to stand at room temperature for 27 days. The viscosity of the solution increased only about 7 cs.

The main batch of the resin solution was cooled and washed with dilute acid and water until neutral. The solvent was removed leaving a hard, brittle material which melted to a thin liquid at 100° C. and had a nil OH content as determined by the Zerewitinoff method. The resin was still thermoplastic and toluene-soluble after one week at 250° C.

*Example 4*

The siloxane of Example 3 was treated in accordance with the procedure of Example 3 in a series of runs, in the first of which benzene was employed as the solvent, in the second of which a fifty-fifty mixture of toluene and isopropanol was used as solvent, and in the third NaOH in amount of one Na to 100 Si was employed as a catalyst. In all three runs thermoplastic, heat-stable resins were obtained.

*Example 5*

The siloxane employed in this run was composed of monophenylsiloxane units, monomethylsiloxane units, phenylmethylsiloxane units and methyldiphenyl siloxane units, so proportioned that the siloxane had a degree of substitution of 1.5 hydrocarbon radicals per silicon atom. The hydroxyl content was 0.89 per cent based on the weight of the siloxane.

A solution of 149.4 g. of the siloxane in 148.3 g. of toluene was refluxed with 0.743 g. of 86 per cent KOH. The concentration of the solution was 50.2 per cent by weight siloxane and the K to Si atomic ratio was 1 to 105. After 24 hours refluxing the solution was cooled, diluted with ether and washed with dilute acid and water until neutral. The solvent was evaporated to give a soft, tacky, hydroxyl-free resin which melted to a thin fluid below 250° C. The material was still thermoplastic and toluene-soluble after one week at 250° C. By contrast the original untreated siloxane set to a toluene-insoluble, infusible gel in a few hours at 250° C.

*Example 6*

The initial siloxane of Example 5 was refluxed in a 75 percent by weight toluene solution with potassium hydroxide in amount of 1 K. per 1,000 Si. After 46 hours the solution was cooled and the alkali was neutralized by the addition of 0.4 cc. of trimethylchlorosilane in an equal volume of toluene. The excess chlorosilane was removed by distillation and the solvent was removed by evaporation. The neutral solvent-free resin was a soft, thermoplastic material which melted below 250° C. It was toluene-soluble and thermoplastic after two days at that temperature.

*Example 7*

A polysiloxane having the composition 50 prime mol percent $C_6H_5CH_3SiO$, 20 prime mol percent $C_6H_5SiO_{1.5}$ and 30 prime mol percent $CH_3SiO_{1.5}$ was equilibrated by refluxing a 75 percent by weight toluene solution of the siloxane with KOH in amount of 1 K. per 200 Si.

30 g. of $C_6H_5CH_3SiO$ fluid having a OH content of 1.22 percent was added to 40 g. of the above 75 percent alkaline solution. The addition of the phenylmethylsiloxane brings the concentration of the solution to 86 per cent by weight total siloxane and changes the potassium to silicon ratio to about 1 K. to 400 Si. After addition of the phenylmethylsiloxane, the composition of the copolymer was 75 prime mol per cent $C_6H_5CH_3SiO$, 10 prime mol percent $C_6H_5SiO_{1.5}$ and 15 prime mol per cent $CH_3SiO_{1.5}$. The degree of substitution was 1.75 hydrocarbon radicals per silicon atom. The 86 per cent siloxane solution was heated at a temperature of 125° C. Water split out rapidly and was removed through the condenser. At first the material gelled but, continued heating caused the gel to re-dissolve to produce a homogeneous solution. Heating was continued for 30 hours at from 125° to 140° C. The solution was then cooled, diluted with ether and the alkali was removed by washing the solution with water until neutral. The solvent was removed to give a liquid copolymer having a viscosity of 263,000 cs. at 25° C. The product was hydroxyl-free and did not become insoluble in toluene after three weeks at 250° C.

*Example 8*

A copolymer siloxane having a composition 50 prime mol per cent $C_6H_5CH_3SiO$, 20 prime mol percent $C_6H_5SiO_{1.5}$ and 30 prime mol percent $CH_3SiO_{1.5}$ was employed in these experiments. Potassium hydroxide was added to a 75 percent toluene solution of the siloxane in amount sufficient to give a potassium to silicon ratio of 1 to 500. Three 4 g. samples of the alkaline 75 per cent solution were each sealed in glass tubes and treated as follows: The first sample was heated at 115° C. for 18 hours. The second sample was heated at 150° C. for 18 hours and the third sample was heated at 250° C. for 18 hours. The tubes were allowed to cool and the solution in each was neutralized by washing with dilute acid and then with water. The solvent was removed from each and the products so obtained were all thermoplastic, heat-stable materials.

*Example 9*

When a hydroxyl containing copolymeric siloxane having the composition 10 prime mol per cent tolylmethyl siloxane units, 40 prime mol per cent dimethyl siloxane units and 50 mol per cent monomethyl siloxane units is refluxed in a 50 per cent by weight solution of the siloxane in dibutyl ether with potassium hydroxide in amount of one potassium atom per 500 silicon atoms until the siloxane becomes hydroxyl-free, a heat-stable, thermoplastic siloxane is formed.

That which is claimed is:

1. A method of preparing a thermoplastic organo polysiloxane in which the organic radicals are selected from the group consisting of methyl and aryl radicals, said polysiloxane containing at least 0.1 per cent by weight hydroxyl radicals and having a degree of substitution of between 0.9 and 1.77 organic radicals per silicon atom and there being at least one aryl radical per 20 silicon atoms, which method comprises maintaining the polysiloxane in solution in an inert solvent, said solution having a concentraton less than $2(45 D-30)$ per cent by weight of the polysiloxane based on the weight of the solution, where D is the degree of substitution of the siloxane, at a temperature between 30° and 250° C., with an alkali metal hydroxide in amount of from one alkali metal atom per 10,000 silicon atoms to one alkali metal atom per 50 silicon atoms, until a hydroxyl-free polysiloxane is obtained.

2. A method of preparing a thermoplastic organo polysiloxane in which the organic radicals are selected from the group consisting of methyl and aryl radicals, said polysiloxane containing at least 0.1 per cent by weight hydroxyl radicals and having a degree of substitution of of between 0.9 and 1.77 organic radicals per silicon atom and there being at least one aryl radical per 20 silicon atoms, which method comprises maintaining the polysiloxane in solution in an inert solvent, said solution having a concentration less than $2(45 D-30)$ per cent by weight of the polysiloxane based on the weight of the solution, where D is the degree of substitution of the siloxane, at a temperature between 30° and 250° C., with an alkali metal hydroxide in amount of from one alkali metal atom per 10,000 silicon atoms to one alkali metal atom per 50 silicon atoms, until the polysiloxane is hydroxyl-free and until the solution reaches a constant viscosity.

3. A method of preparing a thermoplastic organo polysiloxane in which the organic radicals are selected from the group consisting of methyl and phenyl radicals, said polysiloxane containing at least 0.1 per cent by weight hydroxyl radicals and having a degree of substitution of between 0.9 and 1.77 organic radicals per silicon atom and there being at least one phenyl radical per 20 silicon atoms, which method comprises maintaining the polysiloxane in solution in an inert solvent, said solution having a concentration less than $2(45 D-30)$ per cent by weight of the polysiloxane based on the weight of the solution, where D is the degree of substitution of the siloxane, at a temperature between 30° and 250° C., with potassium hydroxide in amount of from one potassium atom per 1,000 silicon atoms to one potassium atom per 50 silicon atoms, until a hydroxyl-free polysiloxane is obtained.

4. A method of preparing a thermoplastic organo polysiloxane in which the organic radicals are selected from the group consisting of methyl and phenyl radicals, said polysiloxane containing at least 0.1 percent by weight hydroxyl radicals and having a degree of substitution of between 0.9 and 1.77 organic radicals per silicon atom and there being at least one phenyl radical per 20 silicon atoms, which method comprises maintaining the polysiloxane in solution in an inert solvent, said solution having a concentration less than $2(45 D-30)$ percent by weight of the polysiloxane based on the weight of the solution, where D is the degree of substitution of the siloxane, at a temperature between 30° and 250° C., with potassium hydroxide in amount of from one potassium atom per 1,000 silicon atoms to one potassium atom per 50 silicon atoms, until the polysiloxane is hydroxyl-free and until the solution reaches a constant viscosity.

5. A method of preparing a thermoplastic organo polysiloxane in which the organic radicals are selected from the group consisting of methyl and tolyl radicals, said polysiloxane containing at least 0.1 percent by weight hydroxyl radicals and having a degree of substitution of between 0.9 and 1.77 organic radicals per silicon atom and there being at least one tolyl radical per 20 silicon atoms, which method comprises maintaining the siloxane in solution in an inert solvent, said solution having a concentration less than $2(45 D-30)$ percent by weight of the polysiloxane based on the weight of the solution, where D is the degree of substitution of the siloxane, at a temperature between 30° and 250° C., with potassium hydroxide in amount of from one potassium atom per 1,000 silicon atoms to one potassium atom per 50 silicon atoms, until a hydroxyl-free polysiloxane is obtained.

6. A method of preparing a thermoplastic organo polysiloxane in which the organic radicals are selected from the group consisting of methyl and tolyl radicals, said polysiloxane containing at least 0.1 per cent by weight hydroxyl radicals and having a degree of substitution of between 0.9 and 1.77 organic radicals per silicon atom and there being at least one tolyl radical per 20 silicon atoms, which method comprises maintaining the siloxane in solution in an inert solvent, said solution having a concentration less than $2(45 D-30)$ percent by weight of the polysiloxane based on the weight of the solution, where D is the degree of substitution of the siloxane, at a temperature between 30° and 250° C., with potassium hydroxide in amount of from one potassium atom per 1,000 silicon atoms to one potassium atom per 50 silicon atoms, until the polysiloxane is hydroxyl-free and until the solution reaches a constant viscosity.

7. A method of preparing a thermoplastic, solvent-free organo polysiloxane in which the organic radicals are selected from the group consisting of methyl and aryl radicals, said polysiloxane containing at least 0.1 per cent by weight hydroxyl radicals and having a degree of substitution of between 0.9 and 1.77 organic radicals per silicon atom and there being at least one aryl radical per 20 silicon atoms, which method comprises maintaining the polysiloxane in solution in an inert solvent, said solution having a concentration less than $2(45 D-30)$ per cent by weight siloxane based on the weight of the solution, where D is the degree of substitution of the siloxane, at a temperature between 30° and 250° C., with an alkali metal hydroxide in amount of from one alkali metal atom per 10,000 silicon atoms to one alkali metal atom per 50 silicon atoms, until a hydroxyl-free polysiloxane is obtained and thereafter removing the alkali metal hydroxide and evaporating the solvent.

8. A method of preparing a thermoplastic, solvent-free organo polysiloxane in which the organic radicals are selected from the group consisting of methyl and aryl radicals, said polysiloxane containing at least 0.1 per cent by weight hydroxyl radicals and having a degree of substitution of between 0.9 and 1.77 organic radicals per silicon atom and there being at least one aryl radical per 20 silicon atoms, which method comprises maintaining the polysiloxane in solution in an inert solvent, said solution having a concentration less than $2(45 D-30)$ per cent by weight siloxane based on the weight of the solution, where D is the degree of substitution of the siloxane, at a temperature between 30° and 250° C., with an alkali metal hydroxide in amount of from one alkali metal atom per 10,000 silicon atoms to one alkali metal atom per 50 silicon atoms, until the siloxane is hydroxyl-free and until the solution reaches a constant viscosity, and thereafter removing the alkali metal hydroxide and evaporating the solvent.

JAMES FRANKLIN HYDE.
WILLIAM HERBERT DAUDT.

REFERENCES CITED

The following references are of record in the file of this patent:

UNITED STATES PATENTS

| Number | Name | Date |
| --- | --- | --- |
| 2,371,068 | Rochow | Mar. 6, 1945 |
| 2,432,665 | Hyde | Dec. 16, 1947 |
| 2,443,353 | Hyde et al. | June 15, 1948 |
| 2,465,188 | Barry et al. | Mar. 22, 1949 |

FOREIGN PATENTS

| Number | Country | Date |
| --- | --- | --- |
| 583,875 | Great Britain | Jan. 1, 1947 |

OTHER REFERENCES

Kipping et al., Journ. Chem. Soc. Lond., vol. 105, 1914, pp. 484–486, 494 to 499. (Copy in Science Libr.)

Kipping et al., J. Chem. Soc. Lond., 1928, pp. 1427, 1429. (Copy in Science Libr.)